US010030594B2

(12) United States Patent
David et al.

(10) Patent No.: US 10,030,594 B2
(45) Date of Patent: Jul. 24, 2018

(54) ABUSE MODE TORQUE LIMITING CONTROL METHOD FOR A BALL-TYPE CONTINUOUSLY VARIABLE TRANSMISSION

(71) Applicant: Dana Limited, Maumee, OH (US)

(72) Inventors: Jeffrey M. David, Cedar Park, TX (US); T. Neil McLemore, Georgetown, TX (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 15/265,226

(22) Filed: Sep. 14, 2016

(65) Prior Publication Data

US 2017/0082049 A1 Mar. 23, 2017

Related U.S. Application Data

(60) Provisional application No. 62/220,293, filed on Sep. 18, 2015.

(51) Int. Cl.
| | |
|---|---|
| *F16H 63/50* | (2006.01) |
| *F02D 41/02* | (2006.01) |
| *B60W 10/06* | (2006.01) |
| *F16H 61/664* | (2006.01) |
| *F16H 15/28* | (2006.01) |

(52) U.S. Cl.
CPC ......... *F02D 41/0215* (2013.01); *B60W 10/06* (2013.01); *F16H 63/50* (2013.01); *F02D 2200/023* (2013.01); *F02D 2250/26* (2013.01); *F02D 2400/12* (2013.01); *F16H 15/28* (2013.01); *F16H 61/664* (2013.01); *F16H 2063/508* (2013.01)

(58) Field of Classification Search
None
See application file for complete search history.

(56) References Cited

U.S. PATENT DOCUMENTS

| 1,063,244 A | 6/1913 | Dieterich |
| 1,215,969 A | 2/1917 | Murray |
| (Continued) | | |

FOREIGN PATENT DOCUMENTS

| AU | 2011224083 A1 | 10/2011 |
| CN | 101392825 A | 3/2009 |
| (Continued) | | |

OTHER PUBLICATIONS

Co-pending U.S. Appl. No. 15/272,774, filed Sep. 22, 2016.
(Continued)

*Primary Examiner* — Dirk Wright
(74) *Attorney, Agent, or Firm* — Marshall & Melhorn, LLC

(57) ABSTRACT

Provided herein is a control system for a multiple-mode continuously variable transmission having a ball planetary variator operably coupled to multiple-mode gearing. The control system has a transmission control module configured to receive a plurality of electronic input signals, and to determine a mode of operation from a plurality of control ranges based at least in part on the plurality of electronic input signals. The control system includes an engine torque limit sub-module adapted to command an engine torque limit based at least in part on the operating conditions of the continuously variable transmission.

9 Claims, 9 Drawing Sheets

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Eklund et al. |
| 3,505,718 A | 4/1970 | Carlstrom |
| 3,583,060 A | 6/1971 | Sigmans |
| 3,688,600 A | 9/1972 | Leonard |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | Depuy |
| 4,046,988 A | 9/1977 | Okuda et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,401,022 B2 * | 6/2002 | Kubota ............... B60W 10/06 477/43 |
| 6,434,928 B1 * | 8/2002 | Manaka ............. B01D 53/9431 180/65.25 |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim et al. |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |

(56) References Cited

U.S. PATENT DOCUMENTS

| | | |
|---|---|---|
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,156,463 B2 | 10/2015 | Legner et al. |
| 9,194,472 B2 | 11/2015 | Versteyhe et al. |
| 9,347,532 B2 | 5/2016 | Versteyhe et al. |
| 9,353,842 B2 | 5/2016 | Versteyhe et al. |
| 9,404,414 B2 | 8/2016 | Versteyhe et al. |
| 9,416,858 B2 | 8/2016 | Versteyhe et al. |
| 2002/0004438 A1 | 1/2002 | Toukura et al. |
| 2002/0094911 A1 | 7/2002 | Haka |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Shinichiro et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Shinichior et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0276294 A1 | 12/2006 | Coffey et al. |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0203631 A1* | 8/2007 | Shimazu ............... B60W 10/06 701/51 |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0185201 A1 | 8/2008 | Bishop |
| 2009/0017959 A1 | 1/2009 | Triller |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0244990 A1 | 9/2012 | Ogawa et al. |
| 2012/0309579 A1 | 12/2012 | Miller et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0142281 A1 | 5/2015 | Versteyhe et al. |
| 2015/0204429 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0069442 A1 | 3/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0195173 A1 | 7/2016 | Versteyhe et al. |
| 2016/0195177 A1 | 7/2016 | Versteyhe et al. |
| 2016/0281828 A1 | 9/2016 | Haka |
| 2016/0290458 A1 | 10/2016 | Taskiran et al. |

FOREIGN PATENT DOCUMENTS

| | | |
|---|---|---|
| CN | 101617146 A | 12/2009 |
| CN | 202165536 U | 3/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2007046722 A1 | 4/2007 |
| WO | WO-2007051827 A1 | 5/2007 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A2 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |

(56) References Cited

FOREIGN PATENT DOCUMENTS

| WO | WO-2014179717 A1 | 11/2014 |
|----|------------------|---------|
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

Co-pending U.S. Appl. No. 15/284,940, filed Oct. 4, 2016.
PCT/US2016/030930 International Search Report and Written Opinion dated Sep. 23, 2016.
U.S. Appl. No. 14/425,600 Office Action dated Sep. 23, 2016.
Co-pending U.S. Appl. No. 15/209,487, filed Jul. 13, 2016.
Co-pending U.S. Appl. No. 15/215,179, filed Jul. 20, 2016.
Co-pending U.S. Appl. No. 15/260,472, filed Sep. 9, 2016.
Co-pending U.S. Appl. No. 15/265,163, filed Sep. 14, 2016.
Fallbrook Technologies. 'NuVinci® Technology', Feb. 26, 2013; [retrieved on Jun. 5, 2014]. Retrieved from internet:< URL: https://web.archive.org/web/20130226233109/http://www.fallbrooktech.com/nuvinci-technology.
Moore et al. A Three Revolute Cobot Using CVTs in Parallel. Proceedings of IMECE (1999) 6 pgs.
PCT/US2013/021890 International Preliminary Report on Patentability dated Jul. 31, 2014.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Preliminary Report on Patentability dated Mar. 19, 2015.
PCT/US2013/057837 International Search Report and Written Opinion dated Mar. 31, 2014.
PCT/US2013/057838 International Preliminary Report on Patentability dated Mar. 19, 2015.
PCT/US2013/057838 International Search Report and Written Opinion dated Jan. 17, 2014.
PCT/US2013/057839 International Preliminary Report on Patentability dated Mar. 19, 2015.
PCT/US2013/057839 International Search Report and Written Opinion dated Feb. 6, 2014.
PCT/US2013/057866 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/057868 International Search Report and Written Opinion dated Apr. 9, 2014.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058615 International Search Report and Written Opinion dated Feb. 11, 2014.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Preliminary Report on Patentability dated May 28, 2015.
PCT/US2013/070177 International Search Report and Written Opinion dated Apr. 14, 2014.
PCT/US2014/015352 International Search Report and Written Opinion dated May 27, 2014.
PCT/US2014/025001 International Preliminary Report on Patentability dated Sep. 24, 2015.
PCT/US2014/025001 International Search Report and Written Opinion dated Jul. 14, 2014.
PCT/US2014/025004 International Preliminary Report on Patentability dated Oct. 1, 2015.
PCT/US2014/025004 International Search Report and Written Opinion dated Jul. 14, 2014.
PCT/US2014/025005 International Preliminary Report on Patentability dated Oct. 1, 2015.
PCT/US2014/025005 International Search Report and Written Opinion dated Jul. 14, 2014.
PCT/US2014/026619 International Preliminary Report on Patentability dated Sep. 24, 2015.
PCT/US2014/026619 International Search Report and Written Opinion dated Sep. 9, 2014.
PCT/US2014/036621 International Preliminary Report on Patentability dated Nov. 12, 2015.
PCT/US2014/036621 International Search Report and Written Opinion dated Sep. 4, 2014.
PCT/US2014/036623 International Preliminary Report on Patentability dated Nov. 12, 2015.
PCT/US2014/036623 International Search Report and Written Opinion dated Sep. 4, 2014.
PCT/US2014/038439 International Preliminary Report on Patentability dated Nov. 26, 2015.
PCT/US2014/038439 International Search Report and Written Opinion dated Sep. 30, 2014.
PCT/US2014/041124 International Preliminary Report on Patentability dated Dec. 17, 2015.
PCT/US2014/041124 International Search Report and Written Opinion dated Oct. 15, 2014.
PCT/US2014/065792 International Preliminary Report on Patentability dated Jun. 2, 2016.
PCT/US2014/065792 International Search Report and Written Opinion dated Apr. 9, 2015.
PCT/US2014/065796 International Preliminary Report on Patentability dated Nov. 6, 2015.
PCT/US2014/065796 International Search Report and Written Opinion dated Apr. 9, 2015.
PCT/US2014/065909 International Search Report and Written Opinion dated Feb. 19, 2015.
PCT/US2014/065909 Written Opinion dated Dec. 11, 2015.
PCT/US2014/065909 Written Opinion dated Jun. 6, 2016.
PCT/US2015/36170 International Search Report and Written Opinion dated Dec. 17, 2015.
PCT/US2015/37916 International Search Report and Written Opinion dated Sep. 29, 2015.
PCT/US2015/64087 International Search Report and Written Opinion dated Feb. 11, 2016.
PCT/US2016/027496 International Search Report and Written Opinion dated Jul. 8, 2016.
PCT/US2016/038064 International Search Report and Written Opinion dated Sep. 7, 2016.
PCT/US2016/29853 International Search Report and Written Opinion dated Aug. 8, 2016.
U.S. Appl. No. 13/743,951 Office Action dated Aug. 19, 2015.
U.S. Appl. No. 13/743,951 Office Action dated Jan. 21, 2016.
U.S. Appl. No. 13/743,951 Office Action dated Mar. 18, 2015.

(56) References Cited

OTHER PUBLICATIONS

U.S. Appl. No. 14/017,054 Office Action dated Aug. 27, 2014.
U.S. Appl. No. 14/017,054 Office Action dated Dec. 12, 2014.
U.S. Appl. No. 14/175,584 Office Action dated Apr. 2, 2015.
U.S. Appl. No. 14/175,584 Office Action dated Dec. 3, 2015.
U.S. Appl. No. 14/210,130 Office Action dated Jun. 7, 2016.
U.S. Appl. No. 14/210,130 Office Action dated Nov. 20, 2015.
U.S. Appl. No. 14/334,538 Office Action dated Jul. 29, 2016.
U.S. Appl. No. 14/378,750 Office Action dated Apr. 8, 2016.
U.S. Appl. No. 14/425,598 Office Action dated Jun. 14, 2016.
U.S. Appl. No. 14/425,600 Office Action dated May 16, 2016.
U.S. Appl. No. 14/425,842 Office Action dated Jul. 1, 2016.
U.S. Appl. No. 14/426,139 Office Action dated Oct. 6, 2015.
U.S. Appl. No. 14/542,336 Office Action dated Nov. 25, 2015.
U.S. Appl. No. 15/067,752 Office Action dated Jun. 30, 2016.
U.S. Appl. No. 60/616,399, filed Oct. 5, 2004.
U.S. Appl. No. 61/819,414, filed May 3, 2013.
U.S. Appl. No. 62/158,847, filed May 8, 2015.
Wong. The Temple of VTEC Asia Special Focus on the Multimatic Transmission. Temple of VTEC Asia. (5 pgs.) (2000).

* cited by examiner $r_i > r_o$
Underdrive $r_i = r_o$
1:1

$r_i < r_o$
Overdrive

ABUSE MODE TORQUE LIMITING CONTROL METHOD FOR A BALL-TYPE CONTINUOUSLY VARIABLE TRANSMISSION

CROSS-REFERENCE

The present application claims priority to U.S. Provisional Patent Application No. 62/220,293, filed Sep. 18, 2015, which is incorporated herein by reference in its entirety.

BACKGROUND OF THE INVENTION

Continuously variable transmissions (CVT) and transmissions that are substantially continuously variable are increasingly gaining acceptance in various applications. The process of controlling the ratio provided by the CVT is complicated by the continuously variable or minute gradations in ratio presented by the CVT. Furthermore, the range of ratios that may be implemented in a CVT may not be sufficient for some applications. A transmission may implement a combination of a CVT with one or more additional CVT stages, one or more fixed ratio range splitters, or some combination thereof in order to extend the range of available ratios. The combination of a CVT with one or more additional stages further complicates the ratio control process, as the transmission may have multiple configurations that achieve the same final drive ratio.

The different transmission configurations can, for example, multiply input torque across the different transmission stages in different manners to achieve the same final drive ratio. However, some configurations provide more flexibility or better efficiency than other configurations providing the same final drive ratio.

SUMMARY OF THE INVENTION

Provided herein is a computer-implemented system for a vehicle having an engine coupled to an infinitely variable transmission having a ball-planetary variator (CVP), the computer-implemented system comprising: a digital processing device comprising an operating system configured to perform executable instructions and a memory device; a computer program including instructions executable by the digital processing device, the computer program comprising a software module configured to manage a plurality of operating conditions of the vehicle; a plurality of sensors comprising: a CVP input speed sensor configured to sense a CVP input speed; an accelerator pedal position sensor configured to sense an accelerator pedal position, a CVP output speed sensor configured to sense a CVP output speed, wherein the software module determines a current CVP speed ratio based on the CVP input speed and the CVP output speed; an oil temperature sensor configured to sense an oil temperature; wherein the software module is configured to determine a commanded engine torque limit based on the CVP speed ratio, the accelerator pedal position, and the engine oil temperature; wherein the software module is configured to control an engine torque based on the commanded engine torque limit. In some embodiments of the computer-implemented system, the software module further comprises a CVP droop derate sub-module. In some embodiments of the computer-implemented system, the software module further comprises a speed-based derate sub-module. In some embodiments of the computer-implemented system, the software module further comprises a time-based derate sub-module. In some embodiments of the computer-implemented system, the software module further comprises an oil temperature derate sub-module. In some embodiments of the computer-implemented system, the CVP droop derate sub-module comprises a calibration map, the calibration map adapted to store values of the commanded engine torque limit based at least in part on CVP droop. In some embodiments of the computer-implemented system, the speed-based derate sub-module comprises a calibration map, the calibration map adapted to store values of the commanded engine torque limit based at least in part on the CVP input speed and the commanded CVP speed ratio. In some embodiments of the computer-implemented system, the time-based derate sub-module comprises a calibration map, the calibration map adapted to store values of the commanded engine torque limit based at least in part on commanded CVP speed ratio, engine torque, and accelerator pedal position. In some embodiments of the computer-implemented system, wherein the oil temperature derate sub-module comprises a calibration map, the calibration map adapted to store values of an engine torque derate based at least in part on transmission oil temperature.

Provided herein is a computer-implemented system for a vehicle having an engine coupled to an infinitely variable transmission having a ball-planetary variator (CVP), the computer-implemented system comprising: a digital processing device comprising an operating system configured to perform executable instructions and a memory device; a computer program including instructions executable by the digital processing device, the computer program comprising a software module configured to manage a plurality of vehicle operating conditions; a plurality of sensors comprising: a CVP input speed sensor configured to sense a CVP input speed; and a CVP output speed sensor configured to sense a CVP output speed, wherein the software module determines a current CVP speed ratio based on the CVP input speed and the CVP output speed; wherein the software module includes a plurality of calibration maps, each calibration map configured to store values of a commanded engine torque limit based at least in part on the CVP speed ratio. In some embodiments of the computer-implemented system, the software module is adapted to receive a signal indicative of a commanded CVP speed ratio. In some embodiments of the computer-implemented system, the software module further comprises a CVP droop derate sub-module. In some embodiments of the computer-implemented system, the software module further comprises a speed-based derate sub-module. In some embodiments of the computer-implemented system, the CVP droop derate sub-module comprises a first calibration map, the first calibration map adapted to store values of the commanded engine torque limit based at least in part on the commanded CVP speed ratio and the CVP speed ratio. In some embodiments of the computer-implemented system, the speed-based derate sub-module comprises a second calibration map adapted to store values of the commanded engine torque limit based at least in part on the CVP input speed and the commanded CVP speed ratio. In some embodiments of the computer-implemented system, the software module further comprises a time-based derate sub-module. In some embodiments of the computer-implemented system, the time-based derate sub-module further comprises a third calibration map, the third calibration map adapted to store values of the commanded engine torque limit based at least in part on the commanded CVP speed ratio, a current engine torque, and an accelerator pedal position.

Provided herein is a computer-implemented method for controlling engine torque in a vehicle, wherein the vehicle comprises an engine coupled to an infinitely variable transmission (IVT) having a ball-planetary variator (CVP), a plurality of sensors, and a computer-implemented system comprising a digital processing device comprising an operating system configured to perform executable instructions and a memory device, and a computer program including the instructions executable by the digital processing device, wherein the computer program comprises a software module; the method comprising: controlling engine torque by one or more of the plurality of sensors sensing vehicle parameters comprising: an accelerator pedal position, a CVP input speed, a CVP output speed, a current engine torque; the software module determining a first engine torque limit based on a speed ratio droop of the CVP, wherein the speed ratio droop is based on the CVP input speed and the CVP output speed; the software module determining a second engine torque limit based on the CVP input speed; the software module determining a third engine torque limit based on the accelerator pedal position; the software module determining a minimum value among the first engine torque limit, the second engine torque limit, and the third engine torque limit; and the software module commanded an engine torque based on the minimum value. In some embodiments, the computer-implemented system further comprises the software module for determining a temperature derate parameter based on an oil temperature. In some embodiments of the computer-implemented system, the software module applying the derate parameter to the minimum value.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
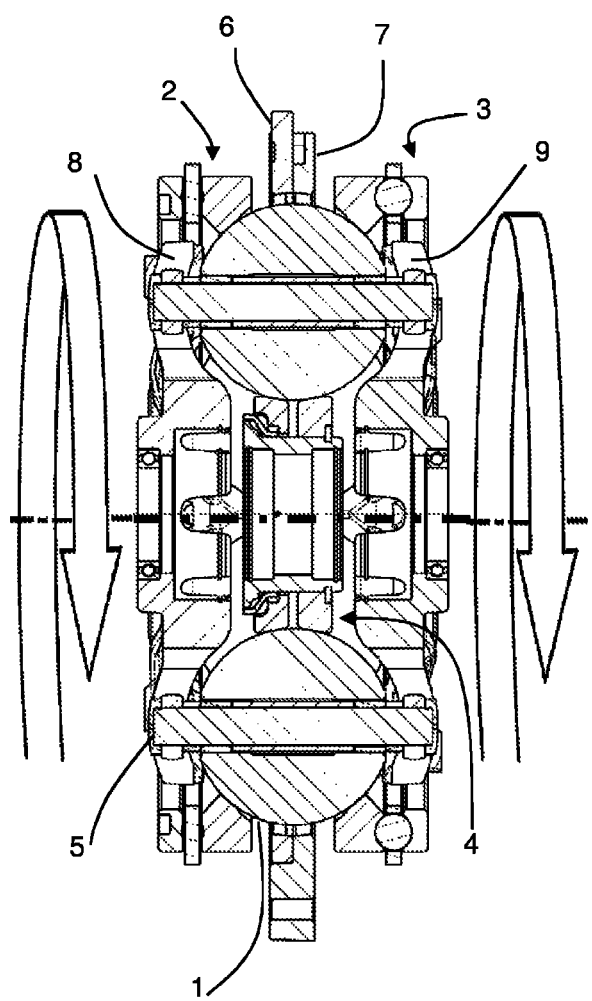
FIG. 1 is a side sectional view of a ball-type variator.

An electronic controller is described herein that enables electronic control over a variable ratio transmission having a continuously variable ratio portion, such as a Continuously Variable Transmission (CVT), Infinitely Variable Transmission (IVT), or variator. The electronic controller is configured to receive input signals indicative of parameters associated with an engine coupled to the transmission. The parameters optionally include throttle position sensor values, accelerator pedal position sensor values, vehicle speed, gear selector position, user-selectable mode configurations, and the like, or some combination thereof. The electronic controller also receives one or more control inputs. The electronic controller determines an active range and an active variator mode based on the input signals and control inputs. The electronic controller controls a final drive ratio of the variable ratio transmission by controlling one or more electronic actuators and/or solenoids that control the ratios of one or more portions of the variable ratio transmission.

The electronic controller described herein is described in the context of a continuous variable transmission, such as the continuous variable transmission of the type described in Patent Application Number PCT/US2014/41124, entitled "3-Mode Front Wheel Drive And Rear Wheel Drive Continuously Variable Planetary Transmission,", U.S. Patent Application No. 62/158,847, each assigned to the assignee of the present application and hereby incorporated by reference herein in its entirety. However, the electronic controller is not limited to controlling a particular type of transmission but is optionally configured to control any of several types of variable ratio transmissions.

Provided herein are configurations of CVTs based on ball type variators, also known as CVP, for continuously variable planetary. Basic concepts of a ball type Continuously Variable Transmissions are described in U.S. Pat. Nos. 8,469,856 and 8,870,711 incorporated herein by reference in their entirety. Such a CVT, adapted herein as described throughout this specification, comprises a number of balls (planets, spheres) 1, depending on the application, two ring (disc) assemblies with a conical surface contact with the balls, as input 2 and output 3, and an idler (sun) assembly 4 as shown on FIG. 1. The balls are mounted on tiltable axles 5, themselves held in a carrier (stator, cage) assembly having a first carrier member 6 operably coupled to a second carrier member 7. The first carrier member 6 rotates with respect to the second carrier member 7, and vice versa. In some embodiments, the first carrier member 6 is substantially fixed from rotation while the second carrier member 7 is configured to rotate with respect to the first carrier member, and vice versa. In some embodiments, the first carrier member 6 is provided with a number of radial guide slots 8. The second carrier member 9 is provided with a number of radially offset guide slots 9. The radial guide slots 8 and the radially offset guide slots 9 are adapted to guide the tiltable axles 5. The axle 5 is adjusted to achieve a desired ratio of input speed to output speed during operation of the CVT. In some embodiments, adjustment of the axles 5 involves control of the position of the first carrier member and the second carrier member to impart a tilting of the axles 5 and thereby adjusts the speed ratio of the variator. Other types of ball CVTs also exist, like the one produced by Milner, but are slightly different.

Figure 2:
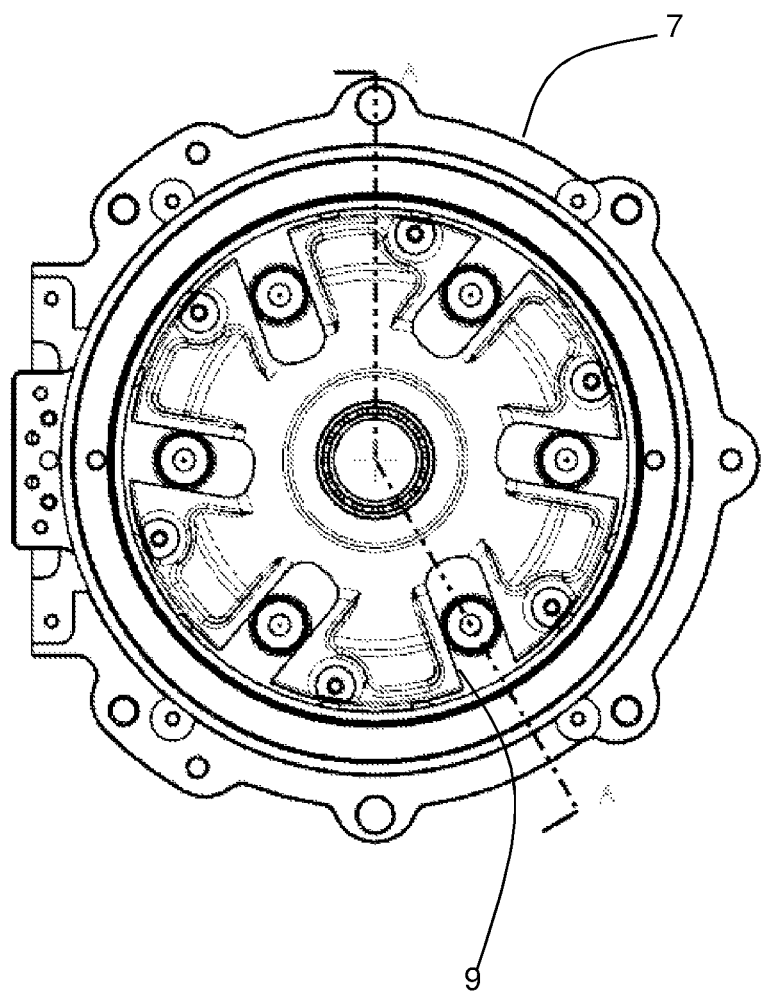
FIG. 2 is a plan view of a carrier member that is used in the variator of FIG. 1.
Figure 3:
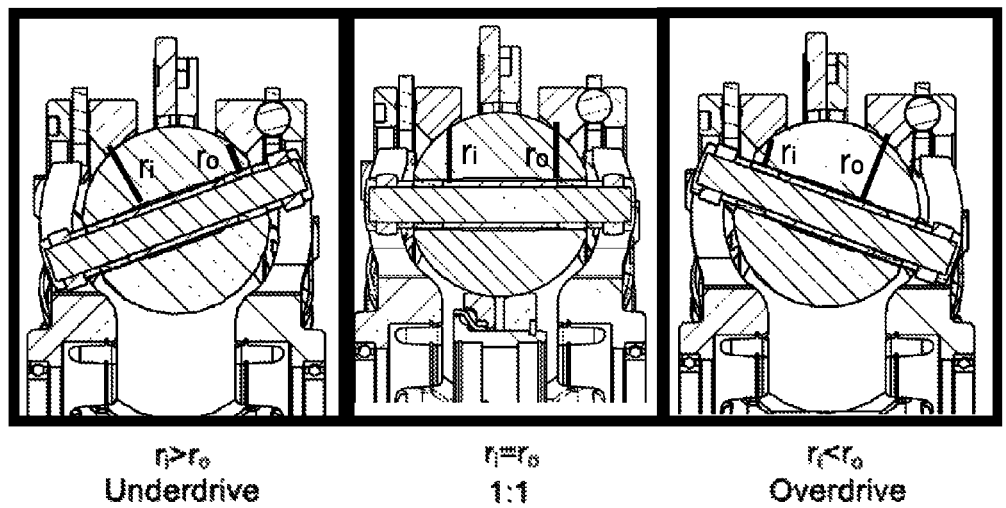
FIG. 3 is an illustrative view of different tilt positions of the ball-type variator of FIG. 1.

The working principle of such a CVP of FIG. 1 is shown on FIG. 2. The CVP itself works with a traction fluid. The lubricant between the ball and the conical rings acts as a solid at high pressure, transferring the power from the input ring, through the balls, to the output ring. By tilting the balls' axes, the ratio is changed between input and output. When the axis is horizontal the ratio is one, illustrated in FIG. 3, when the axis is tilted the distance between the axis and the contact point change, modifying the overall ratio. All the balls' axes are tilted at the same time with a mechanism included in the carrier and/or idler. Embodiments of the invention disclosed here are related to the control of a variator and/or a CVT using generally spherical planets each having a tiltable axis of rotation that is adjusted to achieve a desired ratio of input speed to output speed during operation. In some embodiments, adjustment of said axis of rotation involves angular misalignment of the planet axis in a first plane in order to achieve an angular adjustment of the planet axis in a second plane that is substantially perpendicular to the first plane, thereby adjusting the speed ratio of the variator. The angular misalignment in the first plane is referred to here as "skew", "skew angle", and/or "skew condition". In some embodiments, a control system coordinates the use of a skew angle to generate forces between certain contacting components in the variator that will tilt the planet axis of rotation. The tilting of the planet axis of rotation adjusts the speed ratio of the variator.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, bearing 1011A and bearing 1011B) will be referred to collectively by a single label (for example, bearing 1011).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. As a general matter, the traction coefficient $\mu$ is a function of the traction fluid properties, the normal force at the contact area, and the velocity of the traction fluid in the contact area, among other things. For a given traction fluid, the traction coefficient $\mu$ increases with increasing relative velocities of components, until the traction coefficient $\mu$ reaches a maximum capacity after which the traction coefficient $\mu$ decays. The condition of exceeding the maximum capacity of the traction fluid is often referred to as "gross slip condition".

As used herein, "creep", "ratio droop", or "slip" is the discrete local motion of a body relative to another and is exemplified by the relative velocities of rolling contact components such as the mechanism described herein. In traction drives, the transfer of power from a driving element to a driven element via a traction interface requires creep. Usually, creep in the direction of power transfer is referred to as "creep in the rolling direction." Sometimes the driving and driven elements experience creep in a direction orthogonal to the power transfer direction, in such a case this component of creep is referred to as "transverse creep."

For description purposes, the terms "prime mover", "engine," and like terms, are used herein to indicate a power source. Said power source may be fueled by energy sources comprising hydrocarbon, electrical, biomass, nuclear, solar, geothermal, hydraulic, pneumatic, and/or wind to name but a few. Although typically described in a vehicle or automotive application, one skilled in the art will recognize the broader applications for this technology and the use of alternative power sources for driving a transmission comprising this technology.

Those of skill will recognize that the various illustrative logical blocks, modules, circuits, and algorithm steps described in connection with the embodiments disclosed herein, including with reference to the transmission control system described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such that the processor reads information from, and writes information to, the storage medium. In the alternative, the storage medium may be integral to the processor. The processor and the storage medium may reside in an ASIC. For example, in some embodiments, a controller for use of control of the IVT comprises a processor (not shown).

Figure 4:
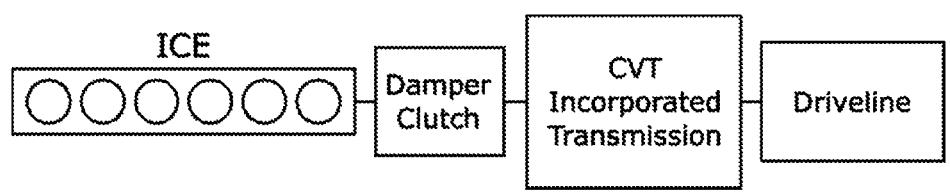
FIG. 4 is a block diagram of a basic driveline configuration of a continuously variable transmission (CVT) used in a vehicle.

Referring now to FIG. 4, in one embodiment, a vehicle is optionally equipped with a driveline having a torsional damper between an engine and an infinitely or continuously variable transmission (CVT) to avoid transferring torque peaks and vibrations that could damage the CVT (called variator in this context as well). In some configurations this damper is optionally coupled with a clutch for the starting function or to allow the engine to be decoupled from the transmission. In other embodiments, a torque converter (not shown), is optionally used to couple the engine to the CVT or IVT. Other types of CVT's (apart from ball-type traction drives) are optionally used as the variator in this layout. In addition to the configurations above where the variator is used directly as the primary transmission, other architectures are possible. Various powerpath layouts are optionally introduced by adding a number of gears, clutches and simple or compound planetaries. In such configurations, the overall transmission provides several operating modes; a CVT, an IVT, a combined mode and so on. A control system for use in an infinitely or continuously variable transmission will now be described.

Provided herein is a computer-implemented system for a vehicle having an engine coupled to an infinitely variable transmission having a ball-planetary variator (CVP), the computer-implemented system comprising: a digital processing device comprising an operating system configured to perform executable instructions and a memory device; a computer program including instructions executable by the digital processing device to create an application comprising a software module configured to manage a plurality of vehicle driving conditions; a plurality of sensors configured to monitor vehicle parameters comprising: CVP input speed, engine torque, accelerator pedal position, CVP speed ratio and oil temperature, wherein the software module is configured to execute instructions provided by an engine torque limit module, wherein the engine torque limit module includes a plurality of calibration maps, each calibration map configured to store values of a plurality of target torque limit values based at least in part on the vehicle parameters monitored by the plurality of sensors.

In some embodiments of the computer-implemented system, the engine torque limit module further comprises a CVP droop derate sub-module.

In some embodiments of the computer-implemented system, the engine torque limit module further comprises a speed-based derate sub-module.

In some embodiments of the computer-implemented system, the engine torque limit module further comprises a time-based derate sub-module.

In some embodiments of the computer-implemented system, the engine torque limit module further comprises an oil temperature derate sub-module.

In some embodiments of the computer-implemented system, the CVP droop derate sub-module comprises a calibration map, the calibration map adapted to store values of torque based at least in part on CVP droop.

In some embodiments of the computer-implemented system, the speed-based derate sub-module comprises a calibration map, the calibration map adapted to store values of torque based at least in part on the CVP input speed and the commanded CVP speed ratio.

In some embodiments of the computer-implemented system, the time-based derate sub-module comprises a calibration map, the calibration map adapted to store values of torque based at least in part on commanded CVP speed ratio, engine torque, and accelerator pedal position.

In some embodiments of the computer-implemented system, the oil temperature derate sub-module comprises a calibration map, the calibration map adapted to store values of torque based at least in part on transmission oil temperature.

Figure 5:
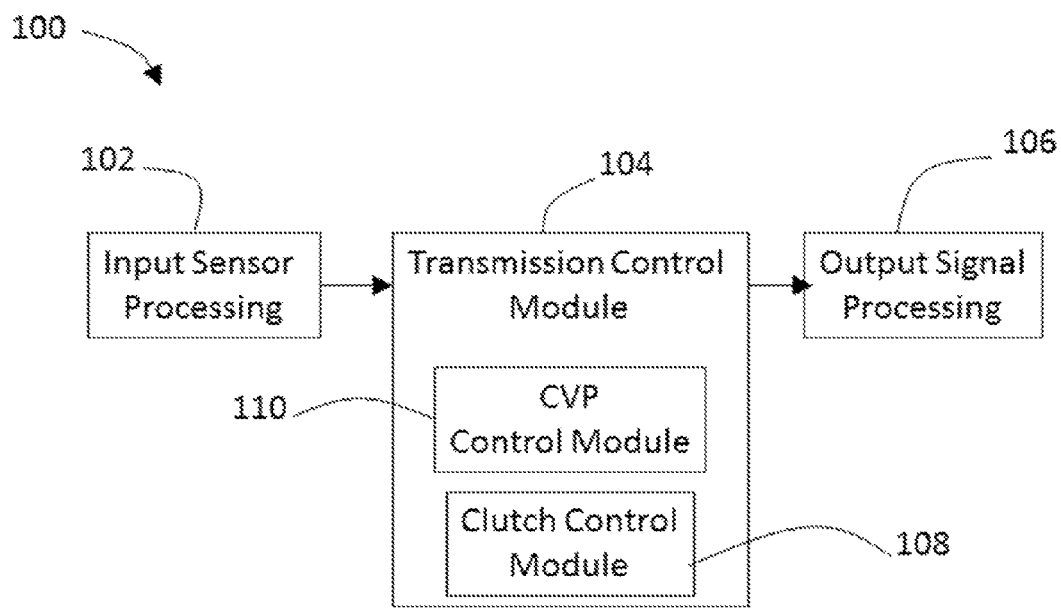
FIG. 5 is a block diagram schematic of a transmission control system that is implemented in a vehicle.

Referring now to FIG. 5, in some embodiments, a transmission controller 100 optionally include an input signal processing module 102, a transmission control module 104 and an output signal processing module 106. The input signal processing module 102 is configured to receive a number of electronic signals from sensors provided on the vehicle and/or transmission. The sensors may include temperature sensors, speed sensors, position sensors, among others. In some embodiments, the signal processing module 102 may include various sub-modules to perform routines such as signal acquisition, signal arbitration, or other known methods for signal processing. The output signal processing module 106 is configured to electronically communicate to a variety of actuators and sensors. In some embodiments, the output signal processing module 106 is configured to transmit commanded signals to actuators based on target values determined in the transmission control module 104. The transmission control module 104 includes a variety of modules, sub-modules, or sub-routines for controlling continuously variable transmissions of the type discussed here. For example, the transmission control module 104 includes a clutch control sub-module 108 that is programmed to execute control over clutches or similar devices within the transmission. In some embodiments, the clutch control sub-module may implement state machine control for the coordination of engagement of clutches or similar devices. The transmission control module 104 includes a CVP control sub-module 110 programmed to execute a variety of measurements and determine target operating conditions of the CVP, for example, of the ball-type continuously variable transmissions discussed here. It should be noted that the CVP control sub-module 110 incorporates a number of modules or sub-modules for performing measurements and control of the CVP. One sub-module included in the CVP control sub-module 110 is described herein.

Figure 6:
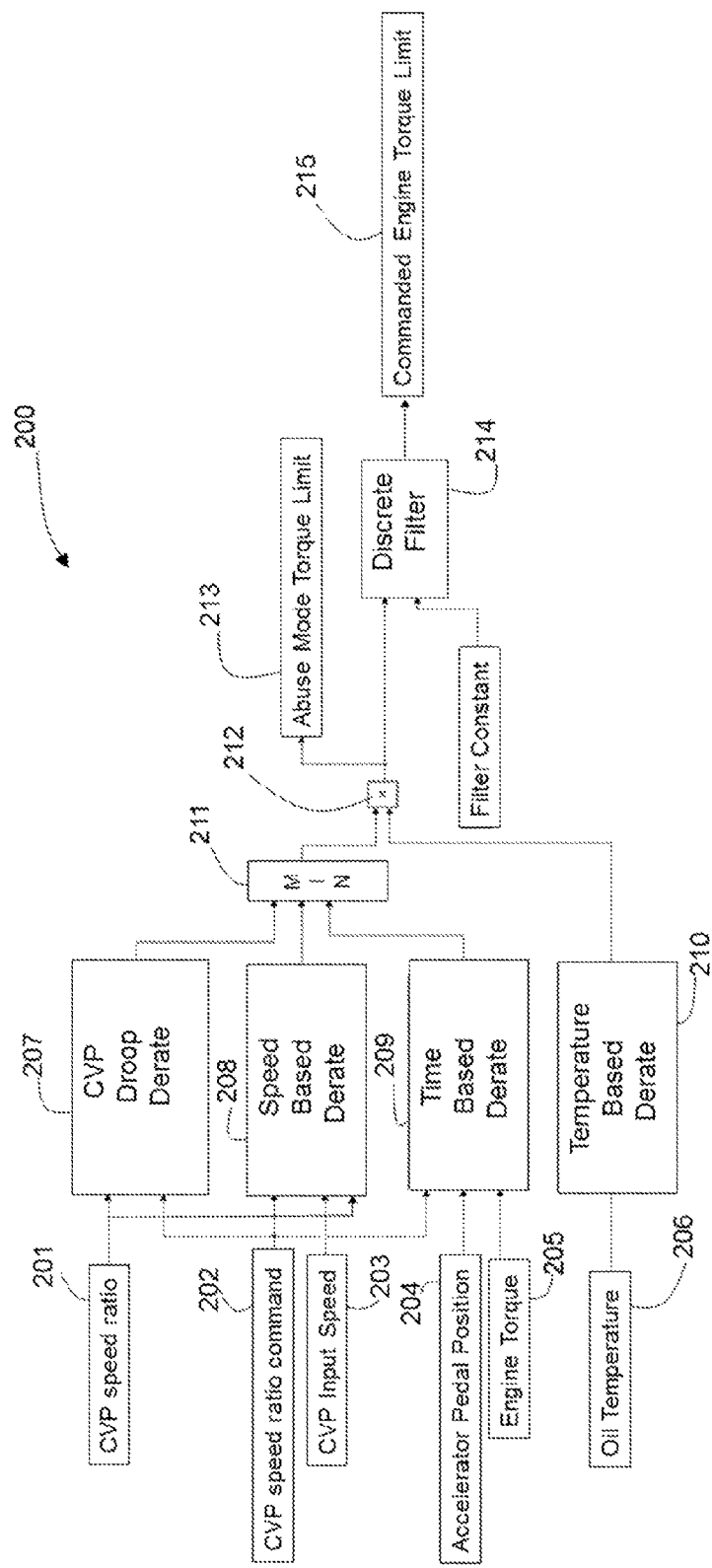
FIG. 6 is a block diagram schematic of an engine torque limit module is implemented in the transmission control system of FIG. 5.

Turning now to FIG. 6, in some embodiments, an engine torque limit module 200 is optionally implemented in the transmission controller 100. In some embodiments, the engine torque limit module 200 is implemented with the CVP control sub-module 110. The engine torque limit module 200 provides a commanded engine torque limit 215 based on transmission operation. The commanded engine torque limit 215 is sent to an engine controller (not shown) equipped in the vehicle.

In some embodiments, the engine torque limit module 200 receives a current CVP speed ratio signal 201. The current CVP speed ratio signal 201 is indicative of the speed ratio the CVP is currently operating. The current CVP speed ratio signal 201 is measured by well-known speed sensors, for example. The engine torque limit module 200 receives a current CVP speed ratio command signal 202. The current CVP speed ratio command signal 202 is a signal that originates from another sub-module in the CVP control sub-module 110. The engine torque limit module 200 receives a CVP input speed signal 203 that can be measured by a speed sensor, for example. The engine torque limit module 200 receives an accelerator pedal position signal 204. The accelerator pedal position signal 204 is indicative of a measured position of an accelerator pedal and is generally an indication of the requested load or torque from the drivetrain. The engine torque limit module 200 receives an engine torque signal 205 that originates from a signal passed from an engine controller (not shown). The engine torque limit module 200 receives a transmission oil temperature signal 206 from a temperature sensor, for example.

In some embodiments, the engine torque limit module 200 includes a CVP droop derate sub-module 207. The CVP droop derate sub-module 207 monitors the current droop value and applies a calibratable torque limit to control the droop and maintain a droop level below the onset of gross slip. Excessive droop, sometimes referred to as creep, leads to heating at the contact patch between the traction rings and balls, and results in a rapid reduction in CVP power capacity.

In some embodiments, the engine torque limit module 200 includes a speed-based derate sub-module 208. The speed-based derate sub-module 208 addresses the circumstance that input speed and ratio are the dominant factors in determining torque capacity for a CVP. In some embodiments, power capacity is greatest at low speed and at 1:1 speed ratio.

In some embodiments, the engine torque limit module 200 includes a time-based derate sub-module 209. The time-based derate sub-module 209 addresses the circumstance where the CVP contact patch temperature can rise rapidly under high load conditions. This temperature rise happens much faster than a thermistor based fluid temperature sensor can react to. The time-based derate sub-module 209 monitors the length of time spent at high load conditions and applies a progressively larger derate value as the time increments. High load is determined by APP and engine torque value received over CAN, for example. The time-based derate sub-module 209 includes exit criteria and a calibratable exit countdown timer to prevent the canceling of a time-based derate upon a momentary blip of APP or torque below enable criteria thresholds.

In some embodiments, the engine torque limit module 200 includes a temperature based derate sub-module 210. The temperature based derate sub-module 210 addresses the circumstance that CVP fluid temperature is also a factor in power capacity.

Still referring to FIG. 6, in some embodiments, the engine torque limit module 200 includes a comparison block 211 that receives signals from the droop derate sub-module 207, the speed-based derate sub-module 208, and the time-based derate sub-module 209. The comparison block 211 passes the minimum value of the inputs to a multiplier block 212. The multiplier block 212 applies an oil temperature based derate factor determined in the temperature based derate sub-module 210 to the output of the comparison block 211 to form an abuse mode torque limit signal 213. The abuse mode torque limit signal 213 is optionally passed to a discrete filter 214 that determines a commanded engine torque limit 215.

Figure 7:
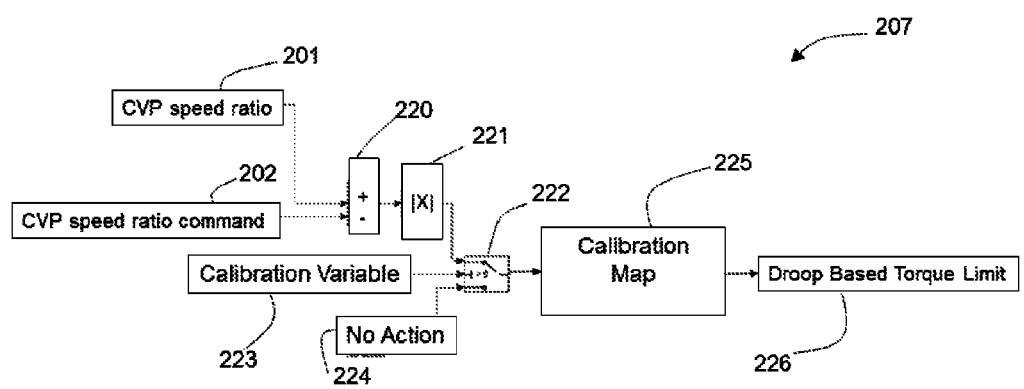
FIG. 7 is a block diagram schematic of a CVP droop derate sub-module that is implemented in the module of FIG. 6.

Referring now to FIG. 7, in some embodiments, the CVP droop derate sub-module 207 receives the current CVP speed ratio signal 201 and the commanded CVP speed ratio signal 202 at an addition block 220 where the difference between the signals is determined. An absolute valve is applied to the difference at a block 221. The difference is passed to a switch block 222. The switch block 222 receives a calibration variable 223. The calibration variable 223 is read from memory or originates in another sub-module of the CVP control sub-module 110. The calibration variable 223 commands is used by the switch block 222 to pass the difference or take no action, as indicated by the block 224. The switch block 222 passes a signal to a calibration map 225 that contains values of torque as a function of droop value and passes a droop based torque limit signal 226 out of the CVP droop derate sub-module 207.

Figure 8:
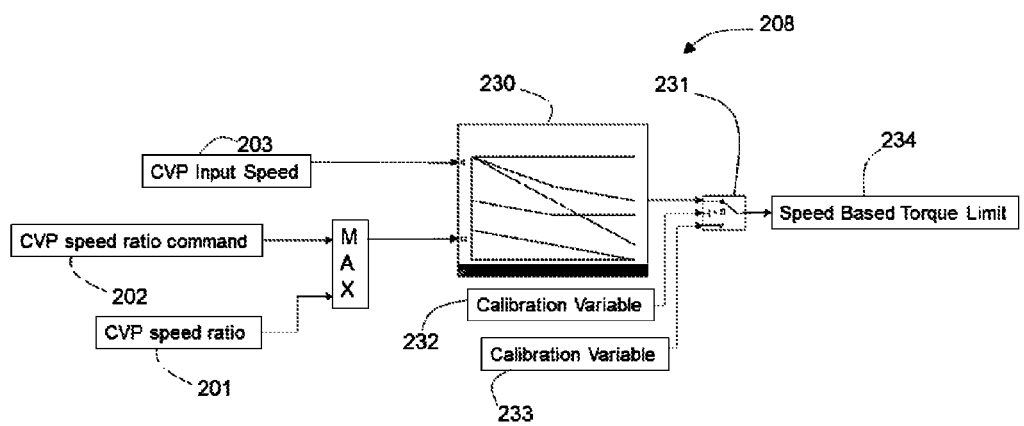
FIG. 8 is a block diagram schematic of a speed-based derate sub-module that is implemented in the module of FIG. 6.

Referring now to FIG. 8, in some embodiments, the speed-based derate sub-module 208 receives the CVP input speed signal 203, the CVP ratio signal 201, and the commanded CVP ratio signal 202 as input variables. The maximum of 201 and 202 is used as the input to a calibration map 230. This accounts for the case in multi-mode transmissions where the droop direction changes in different modes. The calibration map 230 contains values of torque based on CVP speed and CVP speed ratio. The calibration map 230 passes a torque value to a switch block 231. The switch block 231 receives a calibration variable 232 to determine which input to pass. The calibration variable 232 is read from memory or originates in another sub-module of the transmission controller 100. The calibration variable 233 is read from memory or is a signal originating from another sub-module of the transmission controller 100. The switch block 231 passes a speed-based torque limit signal 234 out of the speed-based derate sub-module 208.

Figure 9:
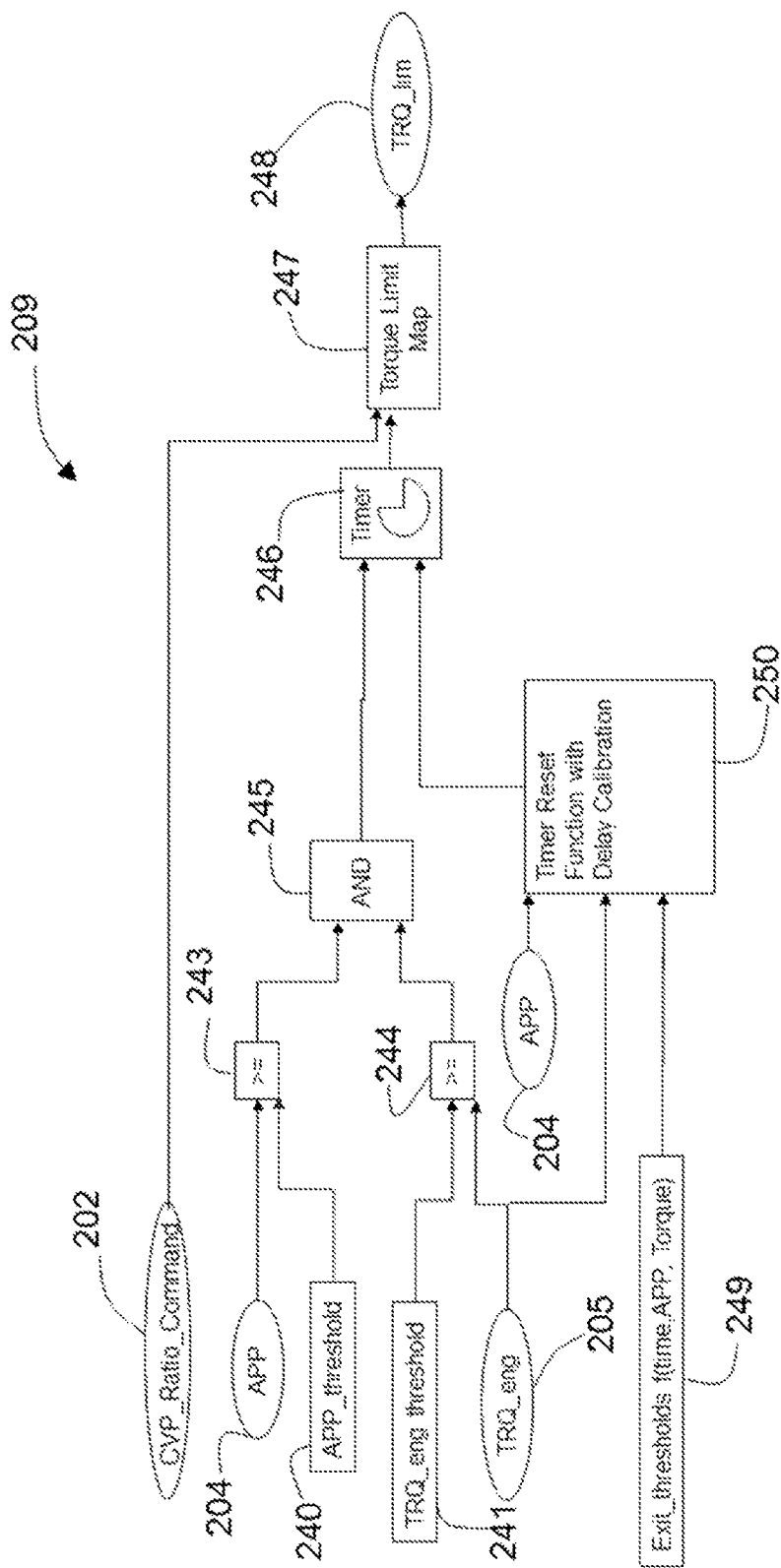
FIG. 9 is a block diagram schematic of a time-based derate sub-module that is implemented in the module of FIG. 6.

Referring now to FIG. 9, in some embodiments, the time-based derate sub-module 209 receives the accelerator pedal position signal 204 and compares the signal to a calibration variable 240 at a comparison block 243. The calibration variable 240 is indicative of an accelerator pedal position threshold. The calibration variable 240 is read from memory or originates in another sub-module of the transmission controller 100. The time-based derate sub-module 209 receives the engine torque signal 205 and compares it to a calibration variable 241 at comparison block 244. A decision block 245 evaluates the signals passed from comparison blocks 243, 244. If the accelerator pedal signal 204 is above the accelerator pedal threshold and the engine torque signal 205 is above the engine torque threshold, then decision block 245 passes a true signal to a timer 246 and the timer begins counting. The timer output is passed to a calibration map 247 that also receives the commanded CVP speed ratio signal 202. The calibration map 247 contains values of torque based on time. The calibration map 247 passes a time-based torque limit signal 248 out of the time-based derate sub-module 209. In some embodiments, the timer 246 receives a reset signal. The time-based derate sub-module 209 receives a calibration variable 249 that is indicative of exit thresholds, for example, based on time, accelerator pedal position, or torque. A timer reset function 250 is implemented that determines a reset signal based at least in part on the accelerator pedal position signal 204, the engine torque 205, and the calibration variable 249.

Figure 10:
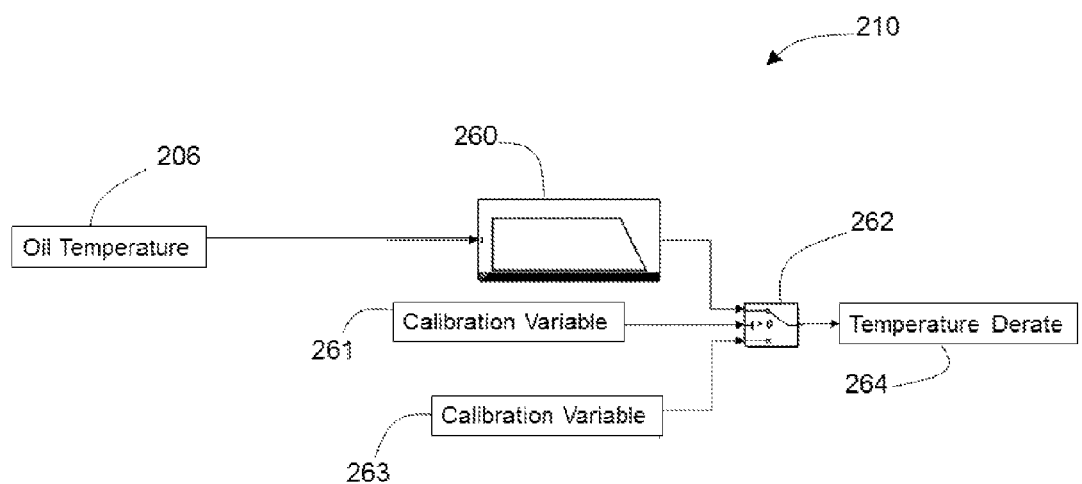
FIG. 10 is a block diagram schematic of a temperature based derate sub-module that is implemented in the module of FIG. 6.

Referring now to FIG. 10, in some embodiments, the temperature based derate sub-module 210 includes a calibration map 260 that contains derate values based on oil temperature, with 1 representing no derate and 0 representing full derate. In some embodiments, the temperature based derate sub-module 210 receives a calibration variable 261 that is used at a switch block 262 to determine which signal to pass. Stated differently, the calibration variable 261 is an enable command to turn the temperature based derate sub-module 210 on and off by passing a calibration variable 263 or the output of the calibration map 260. The temperature based derate sub-module 210 passes a temperature derate signal 264 to the engine torque limit module 200.

Figure 11:
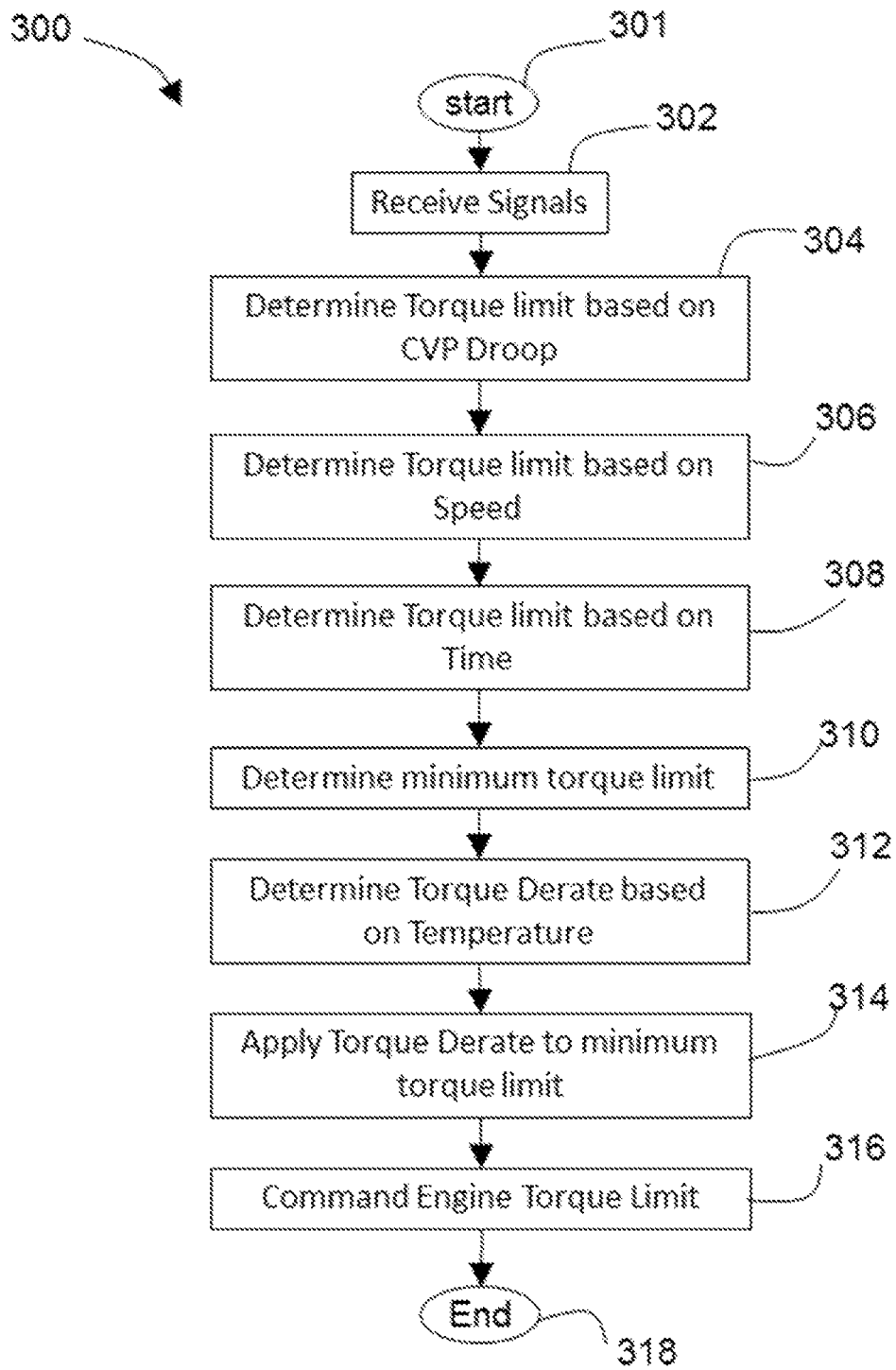
FIG. 11 is a flow chart depicting a process implementable in the transmission control system of FIG. 5.

Referring now to FIG. 11, in some embodiments, a process 300 is optionally implemented in the transmission control system 104. The process 300 starts at a state 301 and proceeds to a block 302 where a number of signals are received. In some embodiments, the signals include a CVP speed ratio, a CVP speed ratio command, an input speed, an engine torque, and a transmission temperature, for example. The process 300 proceeds to a block 304 where a torque limit based on CVP droop is determined. The process 300 proceeds to a block 306 where a torque limit based on speed is determined. The process 300 proceeds to a block 308 where a torque limit based on time on condition is determined. The process 300 proceeds to a block 310 where the minimum torque limit of the limits determined in the block 304, the block 306, and the block 308 is determined. The process 300 proceeds to a block 312 where a temperature based torque derate value is determined. The process 300 proceeds to a block 314 where the temperature based torque derate is applied to the minimum torque limit found in the block 310. The process 300 proceeds to a block 316 where a command for an engine torque limit is sent. The process 300 proceeds to an end state 318.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented system for a vehicle having an engine coupled to an infinitely variable transmission having a ball-planetary variator (CVP), the computer-implemented system comprising:
   a digital processing device comprising an operating system configured to perform executable instructions and a memory device;
   a computer program including instructions executable by the digital processing device, the computer program comprising a software module configured to manage a plurality of operating conditions of the vehicle;
   a plurality of sensors comprising:
      a CVP input speed sensor configured to sense a CVP input speed;
      an accelerator pedal position sensor configured to sense an accelerator pedal position,
      a CVP output speed sensor configured to sense a CVP output speed, wherein the software module determines a current CVP speed ratio based on the CVP input speed and the CVP output speed; and
      an oil temperature sensor configured to sense an oil temperature;
   wherein the software module is configured to determine a commanded engine torque limit based on the CVP speed ratio, the accelerator pedal position, and the engine oil temperature; and
   wherein the software module is configured to control an engine torque based on the commanded engine torque limit.

2. The computer-implemented system of claim 1, wherein the software module further comprises a CVP droop derate sub-module.

3. The computer-implemented system of claim 2, wherein the software module further comprises a speed-based derate sub-module.

4. The computer-implemented system of claim 3, wherein the software module further comprises a time-based derate sub-module.

5. The computer-implemented system of claim 4, wherein the software module further comprises an oil temperature derate sub-module.

6. The computer-implemented system of claim 5, wherein the CVP droop derate sub-module comprises a calibration map, the calibration map adapted to store values of the commanded engine torque limit based at least in part on CVP droop.

7. The computer-implemented system of claim 6, wherein the speed-based derate sub-module comprises a calibration map, the calibration map adapted to store values of the commanded engine torque limit based at least in part on the CVP input speed and the commanded CVP speed ratio.

8. The computer-implemented system of claim 7, wherein the time-based derate sub-module comprises a calibration map, the calibration map adapted to store values of the commanded engine torque limit based at least in part on commanded CVP speed ratio, engine torque, and accelerator pedal position.

9. The computer-implemented system of claim 8, wherein the oil temperature derate sub-module comprises a calibration map, the calibration map adapted to store values of an engine torque derate based at least in part on transmission oil temperature.

* * * * *